United States Patent [19]
Gois

[11] Patent Number: 5,287,645
[45] Date of Patent: Feb. 22, 1994

[54] PURSE RING

[75] Inventor: John F. Gois, La Mesa, Calif.

[73] Assignee: Gemini Capital Group, Inc., San Diego, Calif.

[21] Appl. No.: 924,379

[22] Filed: Jul. 31, 1992

Related U.S. Application Data

[63] Continuation of Ser. No. 741,150, Aug. 7, 1991, abandoned, which is a continuation-in-part of Ser. No. 411,741, Sep. 25, 1989, abandoned, which is a continuation-in-part of Ser. No. 394,070, Aug. 15, 1989, abandoned.

[51] Int. Cl.⁵ .............................................. A01K 73/12
[52] U.S. Cl. ...................................... 43/14; 24/573.5
[58] Field of Search ............... 43/8, 14; 292/106, 108, 292/82.21; 403/327, 330; 59/85, 89, 93; 24/600.1, 600.2, 573.5

[56] References Cited

U.S. PATENT DOCUMENTS

| | | | |
|---|---|---|---|
| 240,132 | 4/1881 | Howe | 24/573.5 |
| 1,415,692 | 5/1922 | Pavoni . | |
| 1,473,983 | 11/1923 | White . | |
| 1,508,705 | 9/1924 | Mahan . | |
| 1,636,209 | 7/1927 | Bergsten | 24/600.2 |
| 3,064,384 | 11/1962 | Lewis et al. | 43/14 |
| 3,789,532 | 2/1974 | Ferguson | 43/14 |
| 4,380,882 | 4/1983 | Flammini | 43/14 |
| 4,802,264 | 2/1989 | Isenhart | 24/573.5 |
| 4,805,334 | 2/1989 | Barclay | 43/7 |
| 4,811,467 | 3/1989 | Lowe | 24/573.5 |
| 5,018,295 | 5/1991 | Taylor, IV | 43/14 |

Primary Examiner—Kurt C. Rowan
Attorney, Agent, or Firm—Nydegger & Associates

[57] ABSTRACT

A purse ring for interconnecting a purse seine to a purse line has a frame with a roller mounted across the frame. The roller permits rolling engagement with the purse line as the purse line is retrieved during seiner operations. The frame of the roller is formed with a pivotable cable release arm to permit insertion or withdrawal of the purse line. A crossbar is also attached across the frame which forms an aperture for connecting the purse ring to a bridle line or some other means of connection to the seine.

5 Claims, 4 Drawing Sheets

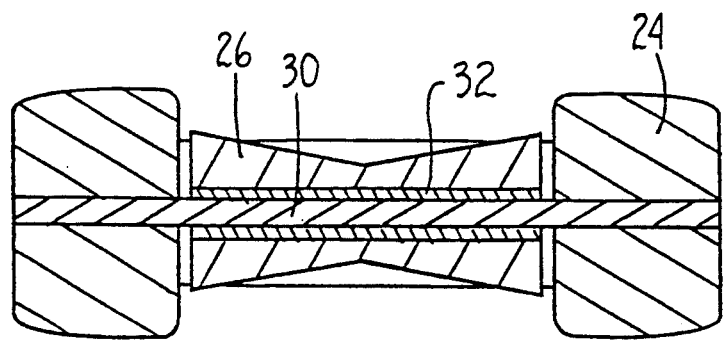
Fig.3
Fig.4A
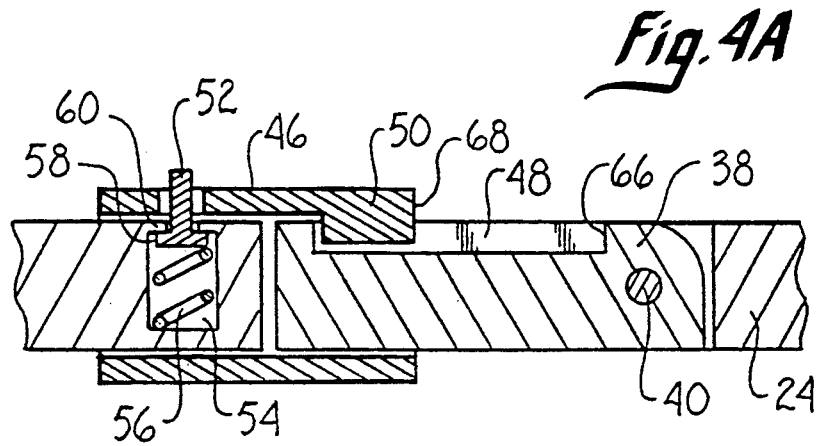
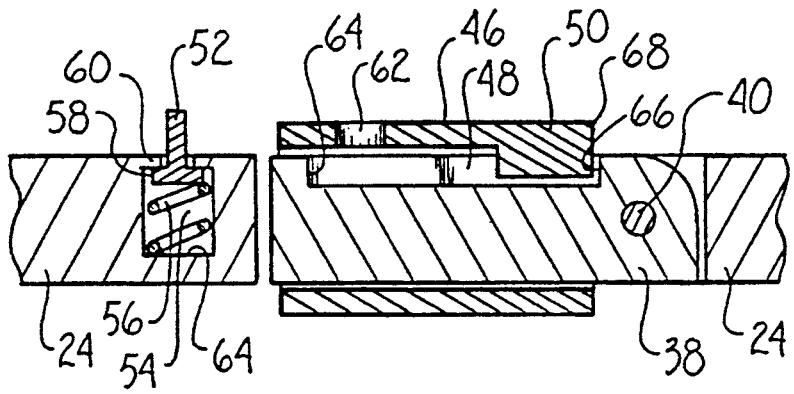
Fig.4B

PURSE RING

This is a continuation of co-pending application Ser. No. 07/741,150, filed on Aug. 7, 1991, now abandoned which was a continuation-in-part of application Ser. No. 07/411,741, now abandoned, which was filed Sep. 25, 1989 as a continuation-in-part of application Ser. No. 07/394,070, now abandoned, which was filed Aug. 15, 1989.

FIELD OF THE INVENTION

The present invention pertains to seine equipment used in fishing operations. More specifically, the present invention pertains to purse rings which connect the fishing net to a pursing cable or purse line. The present invention is particularly, but not exclusively, useful in purse seiner operations wherein a purse line is drawn through a plurality of purse rings to close the seine and retrieve fish caught in the seine.

BACKGROUND OF THE INVENTION

In commercial fishing operations, the method of fishing known as purse seine fishing is an effective and widely used technique. The method is conceptually simple. A seine, or net, is fitted at one end with buoyant devices (e.g. floats) and at the other end with weighting devices (e.g. sinkers). As the seine is deployed in a rough circle, the weighted end of the seine submerges to cause the seine to hang essentially vertically in the water. To provide for seine retrieval, a purse line is attached to the weighted end of the seine by a plurality of connectors, known as purse rings. As the purse line is tightened by fishermen on the fishing vessel, the weighted end of the seine is drawn together to enclose fish within the seine. The weighted end, now pursed, is raised and drawn toward the fishing vessel. Simultaneously, support craft retrieve and draw in the buoyed end of the seine. In this way, fish are trapped in the seine as it is retrieved.

During seine retrieval, the purse line, through its interaction with the purse rings, is used to both purse the seine and draw it toward the fishing vessel. As can be easily imagined, the forces which are generated between the purse line and the purse ring during these operations can be very substantial. Indeed, these forces can cause significant frictional erosion and wear on both the purse line and the surface of the purse rings. The eventual results are a complete failure of the purse rings and a fraying of the purse line which causes the purse line to snag on the netting. In either event, the operation is compromised and the purse rings may need to be replaced.

Recent developments in the commercial fishing area have compounded the problem of purse ring wear because many of the now preferred fishing grounds are located in the Western Pacific Ocean. It happens that purse seiner operations in the Western Pacific require deeper deployment of the seines than thermoclines in the Western Pacific often result in deeper schooling of food fish. Consequently, with the deployment of seines, the forces required to retrieve the seines (e.g. forces between the purse line and the purse rings) are greatly increased. As a further consequence, standard purse rings, such as are used in other oceans of the world, are generally inadequate for use in the Western Pacific.

In light of the foregoing, the present invention recognizes the need to significantly reduce purse ring wear to permit efficient seiner operations at greater depths in the ocean and to prolong the useful life of purse rings used in seiner operations regardless of depth. It is therefore an object of the present invention to provide a purse ring for use in purse seiner fishing operations which has a relatively long period of usefulness. It is a further object of the present invention to provide a purse ring for seiner operations that reduces frictional wear on the purse ring when a purse line is drawn through it during seine retrieval operations. It is yet a further object of the present invention to provide a purse ring for use in purse seiner operations that facilitates purse line insertion into or withdrawal from the purse ring. Another object of the present invention is to provide a purse ring for purse seiner fishing operations which is easy to install and use, relatively easy to manufacture, and comparatively cost-effective.

SUMMARY OF THE INVENTION

A preferred embodiment of the novel purse ring includes an oblong-shaped frame. As envisioned in the present invention, a roller is mounted across the frame near one end of the frame to form a surface for rolling engagement with a purse line during purse seine (fishing net) retrieval operations. Stated differently, to minimize frictional wear between the purse line and purse ring, the purse ring incorporates a roller which extends across the frame to establish a rolling engagement between the purse ring and the purse line as the purse line passes through the purse ring frame. Additionally, a crossbar is fixedly attached across the frame near the end of the oblong frame opposite from the roller to form an aperture. As so attached, the crossbar is used for engaging and protecting the bridle line which connects the purse ring to the seine. In an alternate embodiment of the present invention the cross bar can incorporate a roller similar to the roller disclosed above. With this embodiment the frame effectively has parallel rollers which are mounted across the frame to reduce the frictional forces which are typically generated between the purse line and the purse ring.

The frame may be formed with a cable release arm on its periphery which is pivotable between opened and closed positions to permit insertion or withdrawal of the purse line from the purse ring. Further, the cable release arm may be canted at its pivot point with respect to the frame to permit the cable release arm to pivot out of the plane of the frame and to fully open the access to the ring to facilitate the insertion and withdrawal of the purse line from the purse ring. As an alternative embodiment of the present invention, the frame of the purse ring may still include the roller, but need not include the pivotable cable release arm. Thus, the alternative embodiment can be an integral ring of a type popularly referred to as a "stripper ring". For a stripper ring, like the preferred embodiments of the purse ring, the crossbar can include a roller to help reduce the frictional forces between the ring and the purse line.

The novel features of this invention, as well as the invention itself, both as to its structure and its operation, will be best understood from the accompanying drawings, taken in conjunction with the accompanying description, in which similar reference characters refer to similar parts, and in which:

BRIEF DESCRIPTION OF THE DRAWINGS

FIG. 3 is a cross-sectional view of the purse ring as seen along the line 3—3 in FIG. 2A;

FIG. 4A is a cross-sectional view of the cable release arm of the preferred embodiment in its closed position as seen along the line 4—4 in FIG. 2A;

FIG. 4B is a cross-sectional view of the cable release arm as seen in FIG. 4A with the sleeve of the cable release arm in its open position;

DETAILED DESCRIPTION OF THE PREFERRED EMBODIMENT

Figure 1:
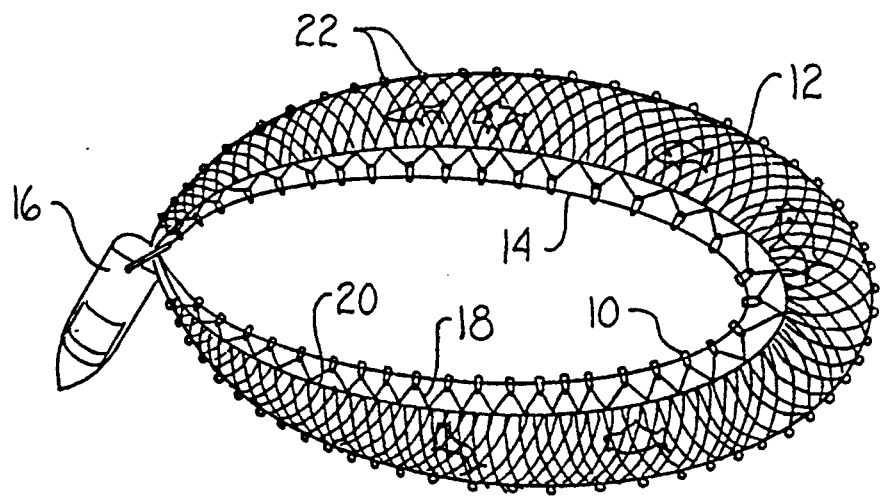
FIG. 1 is a top view of a fishing vessel engaged in seiner operations.

FIG. 1 shows a top overhead view of a purse seiner in operation using a plurality of purse rings designated 10. As shown, the purse rings 10 interconnect seine 12 and purse line 14 during the fishing operations conducted by seiner vessel 16. For purposes of the present invention, it is to be appreciated that purse line 14 may be either a cable, or a rope. More specifically, purse rings 10 are attached to seine 12 with bridle lines 18 which are, in turn, attached to seine 12 at chain 20. Similar to the various embodiments for purse line 14, bridle line 18 may be cables, ropes or chains. Floats 22 provide buoyancy to maintain one side of seine 12 at or near the water's surface while chain 20 and purse rings 10 act as sinkers to vertically orient seine 12. Seine 12 is thus positioned to encircle the school of fish. Catching the fish now requires pursing and retrieving the seine 12. This requires the interaction of purse line 14 with the plurality of purse rings 10.

Figure 2A:
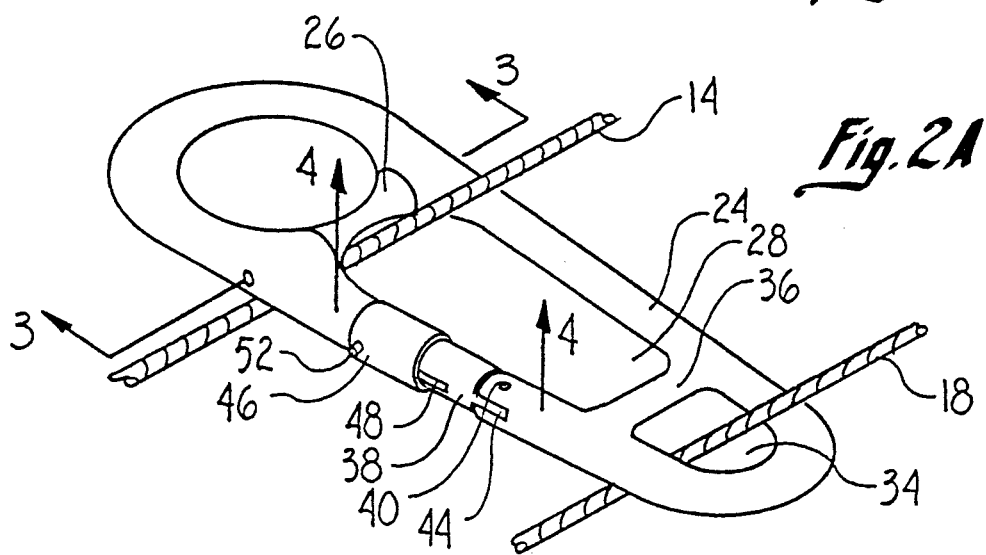
FIG. 2A is a perspective view of the preferred embodiment of the purse ring, showing the cable release arm in its closed position.
Figure 2B:
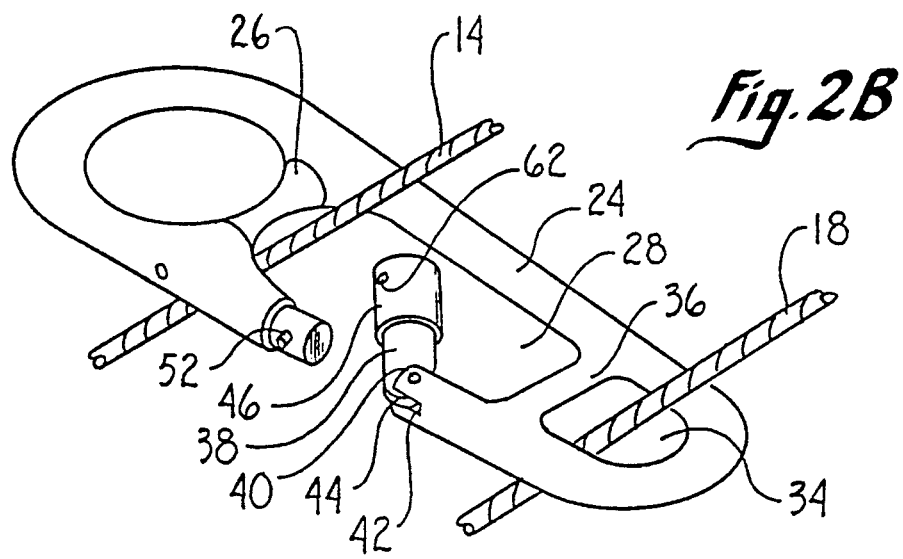
FIG. 2B is a perspective view of the preferred embodiment of the purse ring, showing the cable release arm in its open position.

FIGS. 2A and 2B show a more detailed perspective view of an individual purse ring 10. As shown in FIG. 2A, purse ring 10 comprises a frame 24 which may generally be of any shape that is efficient for connecting purse line 14 to bridle line 18. The preferred embodiment as depicted in FIGS. 2A and 2B is, however, substantially oblong in shape. Also, purse ring 10 is preferably made of steel; however, any material may be used which is strong enough to withstand the forces on purse rings that are inherent in seiner operations. The material of purse ring 10 and its individual components, discussed in detail below, should also be hard enough to resist frictional wear such as is caused when purse line 14 is drawn through purse ring 10, against members of frame 24. Further, the elements of purse ring 10 should be chemically compatible with each other and with the materials of other components of seiner operations so as to minimize the effects of corrosion.

Still referring to FIG. 2A, it can be seen that frame 24 comprises a roller 26 which is positioned across on traverse frame 24 to form a purse line passage 28. The roller 26 is substantially cylindrical, but as shown for the preferred embodiment in FIG. 2A, roller 26 is tapered toward its center to form a guide which facilitates a more efficient rolling contact of the roller 26 with purse line 14. Further, roller 26 should be connected to frame 24 to provide for substantially free rotation and consequent reduced frictional wear on roller 26 when purse line 14 is drawn through passage 28 and against roller 26.

Referring now to FIG. 3, it can be seen that purse ring 10 preferably uses a bushing-shaft arrangement to provide for the rollable connection between roller 26 and frame 24. For this purpose, a shaft 30 is fixedly attached to frame 24 and can even be integrally formed on frame 24. It will be appreciated by the skilled artisan that in the alternative, shaft 30 may be releasably mounted to frame 24 by any means well known in the art. A bushing 32 supports the roller 26 and surrounds shaft 30 to provide for the rolling action of roller 26. Bushing 32 should be constructed of a material which is of sufficient hardness to effectively withstand frictional erosion caused by relative motion between bushing 32 and shaft 30. In the preferred embodiment, bushing 32 is made of brass.

It can be seen in FIG. 2A that the connection between purse ring 10 and bridle line 18 is provided for by an aperture 34 which is formed by positioning a crossbar 36 on frame 24 substantially as shown. This crossbar 36 extends across frame 24 and is fixedly attached to frame 24 by any means well known in the art, such as by being integrally molded to frame 24. FIG. 2A also illustrates a pivot arm 38 in its first position, the fully closed position while FIG. 2B illustrates this same pivot arm 38 in its second, or open, position. Although purse ring 10 may be constructed without pivot arm 38, as shown in the alternative embodiment of purse ring 10 shown in FIG. 5, purse ring 10 can incorporate a pivot arm 38 which is movable between an opened position (FIG. 2B) and a closed position (FIG. 2A) to facilitate the engagement and disengagement of purse line 14 with purse ring 10.

Referring to FIG. 2B, a pivot pin 40 is shown extending through a slot 42 that is formed on frame 24. As shown, pivot pin 40 also extends through an extension 44 of pivot arm 38 to provide for pivotal movement of pivot arm 38 about the pivot pin 40.

Figure 4C:
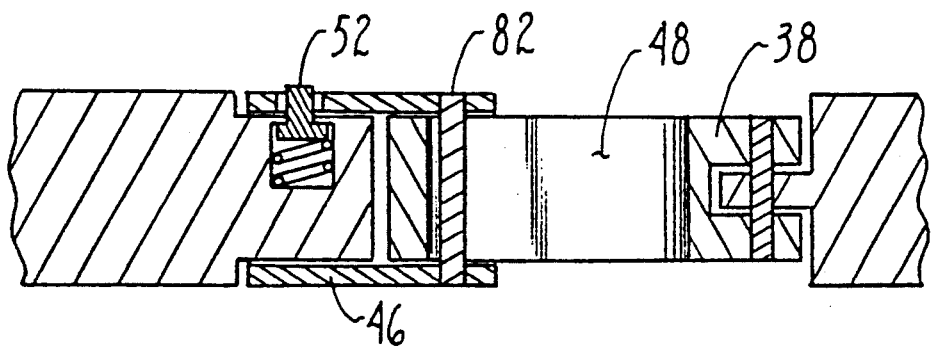
FIGS. 4C and 4D show the sleeve in locked and open positions.
Figure 4D:
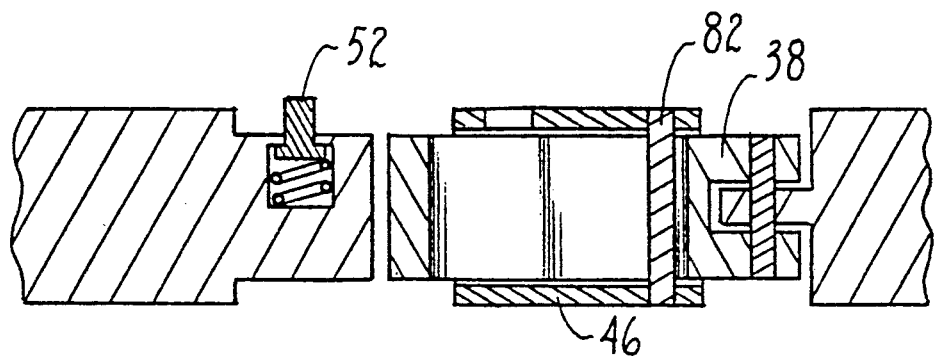

As perhaps best seen in FIG. 4A, a sleeve 46 is slidably mounted on the pivot arm 38 and is movable between a first position (shown in FIG. 4A) wherein pivot arm 38 is held stationary relative to frame 24 to hold purse line 14 in passageway 28, and a second position (shown in FIG. 4B) wherein pivot arm 38 may be pivoted or rotated to open frame 24 and allow purse line 14 to be placed into or removed from passageway 28. As also shown by FIG. 4A, pivot arm 38 is formed with a key guide 48 which slidably receives a key 50 that is integrally connected to sleeve 46.

In order to hold sleeve 46 in its first, or locked, position (FIG. 4A), the sleeve 46 is formed with an opening 62 which slidably receives pin 52 that is mounted on frame 24 and urged into the opening 62 of sleeve 46. Specifically, pin 52 is seated in slot 54 of frame 24 and in contact with a spring 56 that is also housed in slot 54. As will be easily appreciated, the action of spring 56 tends to push pin 52 out of the slot 54. Pin 52, however, is formed with a ring 58 which is urged against abutment 60 by the action of spring 56 against pin 52. Thus, pin 52 is confined to reciprocal movement within slot 54. As will be appreciated by the skilled artisan, pin 52 can be depressed, against the action of spring 56, to position the pin 52 completely within the slot 54. This removes pin 52 from the opening 62 in sleeve 46 and permits the reciprocal movement of sleeve 46 on pivot arm 38.

Sleeve 46 is a substantially hollow cylinder that surrounds pivot arm 38 and frame 24 and is slidably mounted on pivot arm 38. As stated above, any slidable movement of sleeve 46 on pivot arm 38 is prevented when pin 52 is in its extended position, and is received within the opening 62 of sleeve 46, as shown in FIG. 4A. On the other hand, when pin 52 is depressed into the slot 54 of frame 24, sleeve 46 is movable on pivot arm 38 and frame 24, to its position shown in FIG. 4B. The slidable movement between these positions is constrained by the limits imposed on key 50 by stops 64 and 66 of key guide 48. When in the configuration shown in FIG. 4B, pivot arm 38 is in its open position. This, of course, is possible only after pin 52 has been depressed using the thumb of the operator or any suitable tool (not shown) that fits into opening 62 to depress pin 52 to disengage sleeve 46 from frame 24 for slidable movement on pivot arm 38. As shown in FIG. 4B, sleeve 46 is unlocked and has been permitted to slide on pivot arm 38 until butt 68 of key 50 is in contact with stop 66 of key guide 48. Sleeve 46 is thus cleared of frame 24; and pivot arm 38 can be pivoted about pivot pin 40 to open frame 24.

Figure 5:
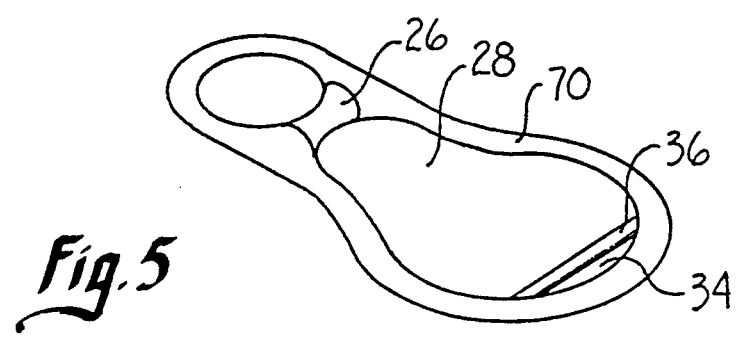
FIG. 5 is a perspective view of the alternate embodiment of the purse ring.

FIG. 5 illustrates an alternative embodiment of purse ring 10 that does not include a pivot arm 38. For this alternate embodiment, frame 70, as shown, can be substantially pear-shaped. Roller 26 is mounted across frame 70 to form a purse line passage 28 in a manner similar to that disclosed above for the preferred embodiment. Likewise, a crossbar 36 is formed transverse to frame 70 to form bridle aperture 34. The material characteristics of alternative frame 70 are in all pertinent respects substantially the same as those described in the preferred embodiment. Similarly, the construction, function and operation of roller 26 and crossbar 34 remain in all material respects unchanged from the preferred embodiment.

Figure 6:
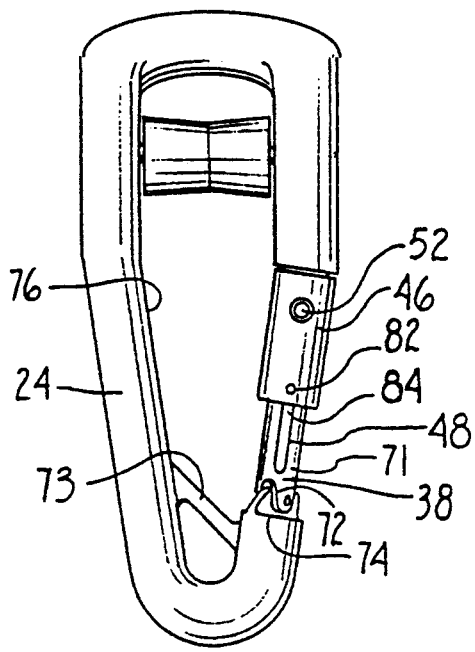
FIG. 6 is a front elevational view of another alternate embodiment of the purse ring showing the cable release arm in its closed position.
Figure 7:
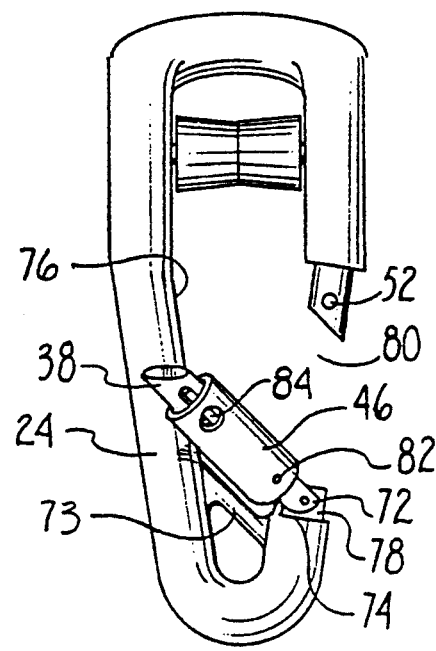
FIG. 7 is a front elevational view of the purse ring embodiment shown in FIG. 6 with the cable release arm in its open position.
Figure 8:
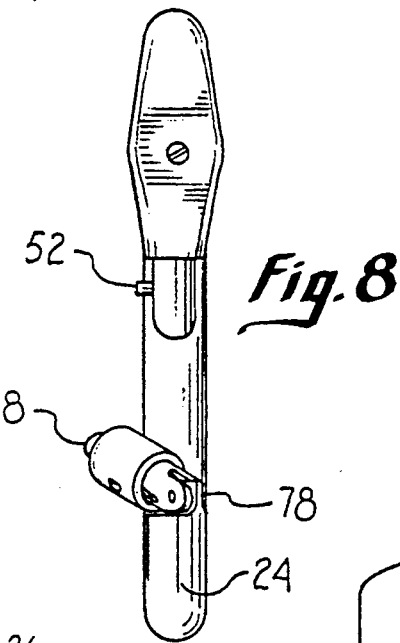
FIG. 8 is a side elevational view of the purse ring embodiment as shown in FIG. 7.

FIGS. 6, 7, 8 show yet another embodiment of a purse ring 10 which has a canted cable release arm 71. More specifically, it is seen in FIG. 6 that canted cable release arm 71 includes a pivot arm 38 which is formed with a nonsymmetric end 72. This non-symmetric end 72 is necessary in order to provide sufficient clearance between the end of 72 of pivot arm 38 and inner edge 74 of frame 24. With this structure pivot arm 38 is able to clear the continuous side of frame 76 and pivot inwardly toward cross frame 73 until pivot arm 38 is substantially parallel to the cross frame 73, as shown in FIG. 7. As indicated above and, as best seen in FIG. 8, extension 78 of frame 24 is canted with respect to frame 24 to permit pivot arm 38 to clear continuous side 76 of frame 24. It will be appreciated that when pivot arm 38 is pivoted to the open position shown in FIGS. 7 and 8, it thereby establishes a relatively unobstructed passage 80 with frame 24 to facilitate insertion or withdrawal of purse line 14 from purse ring 10. Additionally, in the embodiment shown in FIGS. 6, 7, and 8, stop pin 82 is formed on sleeve 46 to perform substantially the same function as the key 50 shown in FIG. 4A. Specifically, stop pin 82 guides sleeve 46 in slidable movement along key guide 48 once pin 52 has been depressed to unlock sleeve 46, as previously described. Stop pin 82 also prevents sleeve 46 from sliding off pivot arm 38 when pivot arm 38 is in the open position by contacting key guide stop 84 of key guide 48.

Figure 9A:
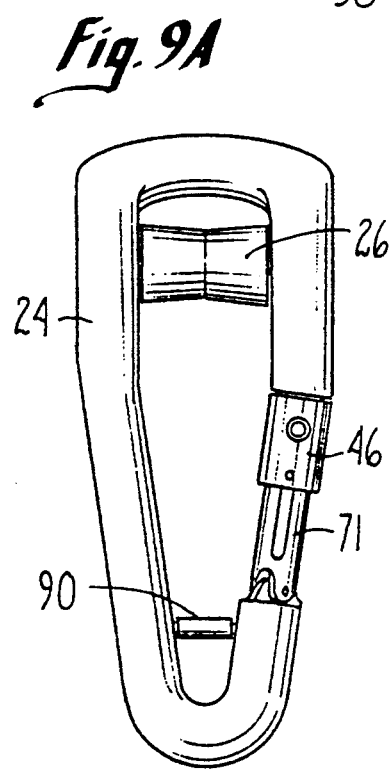
FIG. 9A is a front elevation view of another embodiment of the purse ring incorporating a roller crossbar with the cable release arm in its closed position.
Figure 9B:
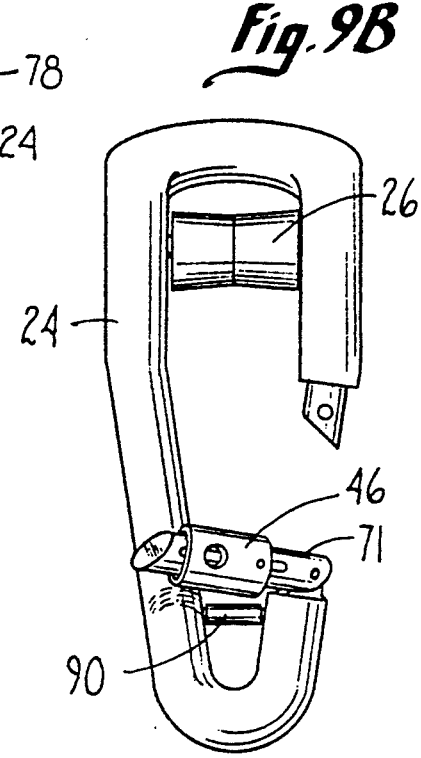
FIG. 9B is a front elevation view of the embodiment of the purse ring shown in FIG. 9A with the cable release arm in its open position.

For yet another embodiment of the purse ring 10 of the present invention, a roller 90 can be incorporated with the crossbar 36 for the purpose of further reducing the frictional forces which can exist between the purse ring 10 and the purse line 14. As shown in FIGS. 9A and 9B, this embodiment for the purse ring 10 can have a functional pivot arm 38 similar to the pivot arm 38 disclosed for embodiments of the purse ring 10 shown in FIGS. 6, 7 and 8. As can be appreciated by the skilled artisan, roller 90 can be incorporated with the crossbar 36 substantially as shown for the embodiments of the purse ring 10 shown in FIGS. 2A, 2B and 5. In all important respects the roller 90 is mounted on frame 24 in a manner similar to that disclosed above for the roller 26.

OPERATION

In the operation of the purse ring 10 of the present invention, purse line 14 is inserted into purse ring 10 by sliding sleeve 46 completely onto pivot arm 38, and further pivoting pivot arm 38 to the position shown in FIG. 2B or 7, depending on the particular embodiment of purse ring 10 which is in use. When pivot arm 38 is in this position, purse line 14 may be inserted or withdrawn from purse ring 10. Alternatively, purse line 14 may be threaded through the passage 28.

The operation discussed above is more particularly described by referring to FIGS. 4A and 4B. Specifically, with sleeve 46 in the position shown in FIG. 4A, pin 52 is depressed into spring 56 with any suitable tool, such as a small spike. Pin 52 is depressed completely through sleeve 46, allowing sleeve 46 to slide along key guide 48 until opening 62 clears pin 52. Once this clearance is effected, the insertion tool may be removed. Sleeve 46 has now been unlocked, and may be slid over pivot arm 38 to the position shown in FIG. 4B. When sleeve 46 is so operated, pivot arm 38 is free to pivot about pivot pin 40, as previously described. Once pivot arm 38 is pivoted back to the position shown in FIG. 2A, sleeve 46 is slidably moved back onto frame 24 until pin 52 is forced into opening 62 by spring 56. This locks pivot arm 38 in place, as shown in FIG. 4A. Seine 12 may then be deployed, and, upon completion of fishing operations, retrieved by drawing purse line 14 into rollable contact with roller 26, which purses purse ring(s) 10. Once seine 12 has been so pursed, it may be retrieved on board vessel 16.

While the particular purse ring as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. A purse ring engageable with the bridle line of a seine for pursing the seine with a purse line during deep-sea fishing operations which comprises:

an oblong-shaped frame member having an aperture therethrough;

a first roller mounted across said frame to bridge said aperture;

a second roller mounted across said frame to bridge said aperture wherein said first and second roller are substantially parallel, said first roller, said second roller and portions of said frame between said first and second rollers defining a periphery around a passageway of said aperture for receiving said purse line therethrough, said purse line being engageable with said first roller to reduce friction therebetween during deployment and retrieval of said seine, and said purse line being engageable with said second roller to protect said bridle line, said periphery further defining plane;

a cable release arm pivotally mounted as a portion of said frame between said first and second rollers to partially define said periphery, said cable release arm being canted, pivotable and operable to interrupt said periphery for insertion and removal of said purse line relative to said passageway, said cable release arm comprising a pivot pin attached to said periphery of said frame, and a pivot member with a first end and a second end, said first end being pivotably attached to said pivot pin for movement of said pivot member out of said plane;

a sleeve slidably attached to said pivot member for engagement and disengagement with said frame, said sleeve having an extended and a retracted position, said sleeve engaging said frame and preventing movement of said pivot member out of said plane when in said extended position, said sleeve being formed with an opening; and a sleeve locking means slidably attached to said frame for maintaining said sleeve in engagement with said frame, said locking means being engageable with said opening formed in said sleeve to prevent movement of said sleeve from said extended position to said retracted position wherein said sleeve locking means comprises a slot defined by said frame, a pin slidingly received by said slot, said pin being extendable from said slot to engage opening in said sleeve, and a spring in said slot, said spring urging said pin to extend from said slot.

2. A purse ring engageable with the bridle line of a seine for pursing the seine with a purse line during deep-sea fishing operations which comprises:

an oblong-shaped frame member having an aperture therethrough;

a first roller mounted across said frame to bridge said aperture;

a second roller mounted across said frame to bridge said aperture, said first roller, said second roller and portions of said frame between said first and second rollers defining a periphery around a passageway of said aperture for receiving said purse line therethrough, said purse line being engageable with said first roller to reduce friction therebetween during deployment and retrieval of said seine, and said purse line being engageable with said second roller to protect said bridle line, said periphery further defining a plane;

a cable release arm pivotally mounted as a portion of said frame between said first and second rollers to partially define said periphery, said cable release arm being pivotable and operable to interrupt said periphery for insertion and removal of said purse line relative to said passageway;

a sleeve slidably attached to said cable release arm for engagement and disengagement with said frame, said sleeve having an extended and a retracted position, said sleeve engaging said frame and preventing movement of said pivot member out of said plane when in said extended position, said sleeve being formed with a lateral opening; and a sleeve locking means slidably attached to said frame for maintaining said sleeve in engagement with said frame, said locking means being engageable with said lateral opening in said sleeve to prevent movement of said sleeve from said extended position to said retracted position wherein said sleeve locking means comprises a slot defined by said frame, a pin slidingly received by said slot, said pin being extendable from said slot to engage said opening in said sleeve, and a spring in said slot, said spring urging said pin to extend from said slot.

3. A purse ring as recited in claim 2 wherein said first roller is substantially parallel to said second roller.

4. A purse ring as recited in claim 2 wherein said cable release arm is canted and said cable release arm is pivotable out of said plane and operable to interrupt said periphery for insertion and removal of said purse line relative to said passageway.

5. A purse ring as recited in claim 4 wherein said canted cable release arm comprises:

a pivot pin attached to said periphery of said frame; and a pivot member with a first end and a second end, said first end being pivotally attached to said pivot pin for movement of said pivot member out of said plane.

* * * * *